United States Patent [19]

Yano et al.

[11] Patent Number: 4,793,402
[45] Date of Patent: Dec. 27, 1988

[54] HEAT STORAGE COMPOSITION, LATENT HEAT STORAGE CAPSULES CONTAINING SAID HEAT-STORAGE COMPOSITION AND TEMPERATURE CONTROL APPARATUS USING SAID CAPSULES

[75] Inventors: Naomichi Yano, Takarazuka; Tadatsugu Ueno, Osaka; Shigeru Tsuboi, Amagasaki, all of Japan

[73] Assignee: Kubota Tekko Kabushiki Kaisha, Osaka, Japan

[21] Appl. No.: 97,146

[22] Filed: Sep. 16, 1987

Related U.S. Application Data

[62] Division of Ser. No. 850,100, Apr. 10, 1986, Pat. No. 4,715,978.

[51] Int. Cl.$^4$ .............................................. F28D 17/00
[52] U.S. Cl. ........................................ 165/10; 165/7; 126/400; 47/17
[58] Field of Search .................. 165/10, 104.11l, 7; 126/400; 47/17

[56] References Cited

U.S. PATENT DOCUMENTS 4,612,974 9/1986 Yamadori .............................. 165/10

FOREIGN PATENT DOCUMENTS 195036 11/1984 Japan ..................................... 165/10
197798 11/1984 Japan ..................................... 165/10
   291  1/1985 Japan ..................................... 165/10

*Primary Examiner*—Albert W. Davis, Jr.
*Attorney, Agent, or Firm*—Oblon, Fisher, Spivak, McClelland & Maier

[57] ABSTRACT

A heat storage composition excellent in heat storing effect contains calcium chloride hexahydrate as the main component and an appropriate amount of a nucleating agent combination for inhibiting supercooling which is composed of barium sulfide, barium chloride dihydrate and strontium chloride hexahydrate or of barium chloride dihydrate and strontium chloride hexahydrate and optionally contains an appropriate amount of a thickening agent combination composed of an ultrafine silica powder and glycerin. Latent heat storage capsules contain the above heat storage composition and are improved particularly in their structure such that improved heat storage and release effects can be produced. A temperature control apparatus can make most of the heat storage capsules in the temperature control of a hothouse or the like.

6 Claims, 14 Drawing Sheets

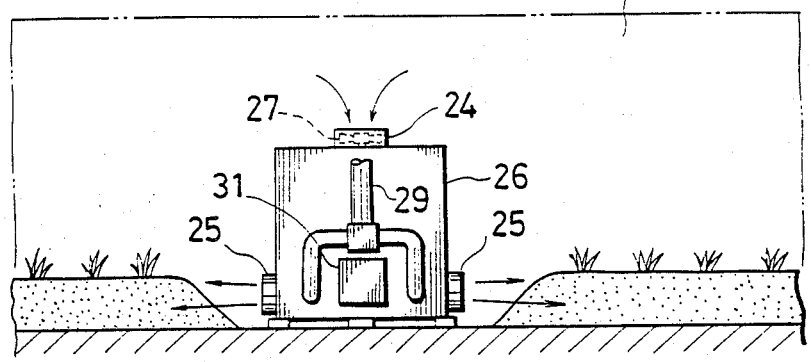
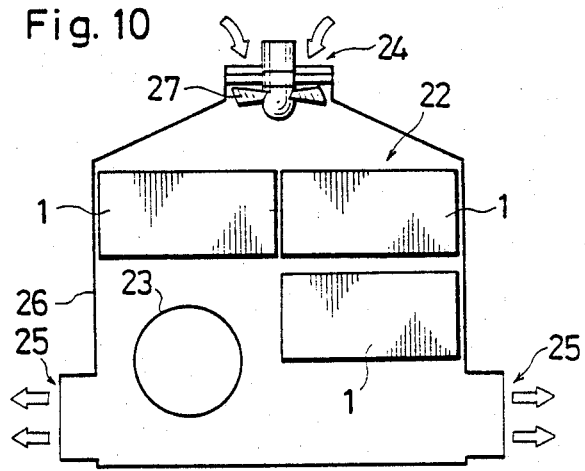
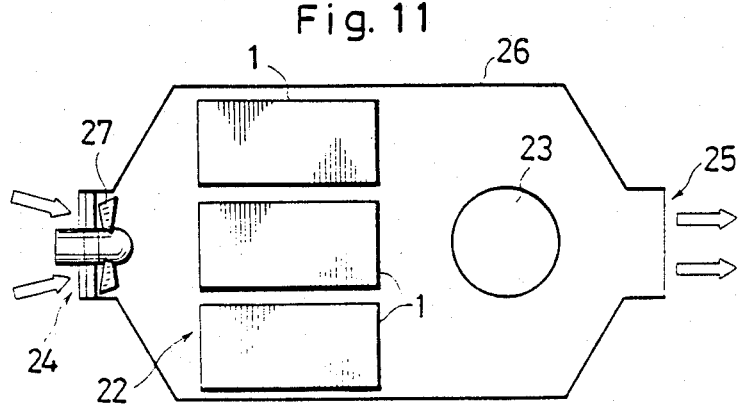

HEAT STORAGE COMPOSITION, LATENT HEAT STORAGE CAPSULES CONTAINING SAID HEAT-STORAGE COMPOSITION AND TEMPERATURE CONTROL APPARATUS USING SAID CAPSULES

This is a division of application Ser. No. 850,100, filed Apr. 10, 1986, now U.S. Pat. No. 4,715,978, granted Dec. 29, 1987.

BACKGROUND OF THE INVENTION

1. Field of the Invention

This invention relates to a heat storage composition for use in greenhouses for facility horticulture or cultivation, in living area heating, in chemical heat pumps, further in solar energy storage tanks and industrial waste heat recovery facilities, and in other fields, to latent heat storage capsules improved such that the heat-storage and release characteristics of said heat-storage composition can be utilized to the possible maximal extent, and to a temperature control apparatus in which said capsules are used efficiently in temperature control in various hothouses and the like.

2. Background Art

Calcium chloride hexahydrate has a solidification point of about 30° C., which is close to the ordinary temperature range, with a great latent heat of solidification/melting which is characteristic of a hydrate, and therefore is coming into wide and practical use in greenhouses for facility horticulture and plant cultivation, in living area heating, in chemical heat pumps, further in solar energy storage tanks and industrial waste heat utilization facilities, among others. However, this compound involves a serious problem that a marked supercooling phenomenon is observed with it. This is an obstacle to practical use of said compound. The phenomenon of supercooling is a phenomenon that the liquid-to-solid phase change does not begin in the process of cooling of a substance in the liquid phase even after passage of the solidification point but at last begins at a temperature considerably below the solidification point. When supercooling takes place, the solidification point at which the latent heat of solidification should be released becomes unspecified and this is a fatal defect in the use as a heat storage material for maintaining a specific temperature range. For solving such problem, a technique of preventing supercooling has been proposed (e.g. Japanese Patent Publication No. 32749/80 and No. 9059/81) which comprises adding to calcium chloride hexahydrate a nucleating agent capable of promoting crystallization thereof. Said technique is under development for early practical use. Many substances are known as nucleating agents for such use, for example, strontium chloride hexahydrate, strontium hydroxide octahydrate, strontium oxide, barium hydroxide octahydrate, barium carbonate and barium nitrate. Addition of these in an amount of 0.1–20 percent by weight on the whole heat-storage composition basis can prevent the supercooling of calcium chloride hexahydrate to a considerable extent.

However, check experiments made by the present inventors for evaluating the effects of various nucleating agents have revealed that any nucleating agent cannot prevent the occurrence of supercooling by about 3°–4° C. Moreover, addition of more than 20 percent by weight of a nucleating agent cannot be expected to produce any further effect.

On the other hand, when calcium chloride hexahydrate is used alone, the latent heat release temperature is specifically restricted to one single point, namely about 30° C. which is the solidification point (and at the same time the melting point) thereof, so that it is difficult to adjust the same to the use conditions with respect to said temperature. Therefore, the latent heat release temperature is generally adjusted by addition of a solidification point adjusting agent such as $FeCl_3.6H_2O$, $MgCl_2.6H_2O$ or $CoCl_2.6H_2O$. However, the nucleation-promoting agents and solidification point modifiers, when used alone in heat-storage compositions, gradually lose their effects upon repeated use as a result of precipitation thereof in the heat-storage material-containing vessels and eventually their effects cannot be fully produced any more in some instances. It is also known that upon repeated liquid-solid phase changes, calcium chloride hexahydrate itself gradually precipitates on the vessel bottom due to a specific gravity difference between the liquid phase (having a specific gravity of 1.5) and the solid phase (having a specific gravity of 1.68), leading to phase separation.

Therefore, for the purpose of increasing the dispersion stability of additives including nucleation-promoting agents and preventing phase separation, a thickening agent is added to heat-storage compositions. The thickening agent is used to achieve the above purpose by providing a melt under use with an appropriate viscosity and includes, among others, alcohols, such as glycerin and ethylene glycol, carboxymethylcellulose and poly(sodium acrylate).

Among the above thickening agents, glycerin is particularly valuable since it is miscible with water in any proportion, is capable of providing an adequate viscosity and has good stability. However, since said substance has solidification point depressing activity, great variations in solidification point are inevitable even when it is used for the purpose of viscosity increase, particularly when it is used in relatively large amounts so as to attain high viscosity values. On the other hand, the use of those thickeners which are so far in general use, for example high-molecular substances such as poly(sodium acrylate) is disadvantageous in that although they have excellent viscosity increasing effects, repeated use thereof results in local caking and viscosity reduction and eventually in failure in its duty to produce homogeneous dispersion.

Failure in dispersion of the nucleating agent and other auxiliary ingredients leads to substantial failure in answering the intended purpose of their incorporation, namely loss of their ability to prevent the phenomenon of supercooling on the occasion of phase transition, and at the same time allows phase separation, whereby the value of the heat-storage material containing them is reduced.

Meanwhile, the use of latent heat-storage capsules with a latent heat-storage material capable of thermal phase change, namely a phase-change material, sealed therein (hereinafter, "PCM capsules") as heat sources for various purposes has been proposed, for example for storing solar energy therein for later heat radiation for heating purposes or, more broadly, for storing solar energy in summer for emission in winter for various heating purposes. Such PCM capsules are under way for practical use.

As the above-mentioned PCM capsules, there are known spherical ones (e.g. Japanese Utility Model Application No. 109283/83) and flat ones (e.g. Japanese Utility Model Application No. 105796/84), among others. From the viewpoints of ease in placing, ease in forced circulation of a heat transfer medium in heat exchange, and so forth, the latter flat PCM capsules may be said to be more advantageous.

In particular, for heat exchange between PCM capsules and air as a heat transfer medium, flat PCM capsules are preferable.

However, flat PCM capsules are very small in thickness as compared with the other dimensions, length and breadth, so that when they are in the vertical disposition, the latent heat-storage material, for example crystalline calcium chloride (CaCl$_2$.6H$_2$O), or a nucleating agent therefor contained in the flat PCM capsules precipitates on the container bottom, whereupon the crystal growth owing to the nucleating agent, namely the phase change of the latent heat-storage material, cannot be promoted in a uniform manner any more, hence, disadvantageously, the heat-storage effect cannot be produced to a satisfactory extent.

It is conceivable that horizontal disposition of flat PCM capsules might solve such problem.

In that case, the nucleating agent is dispersed uniformly and generally over the flat bottom portion of the flat PCM capsules and this favorably causes uniform phase change in the latent heat-storage material. However, when the temperature of the flat PCM capsules is lower than that of air and thus there is a temperature difference from the air in the stage of heat storing, dew condensation can easily occur on the flat PCM capsule surface. The water resulting from this dew condensation can hardly be discharged and moreover that portion of heat which is consumed for the vaporization of this water is directly reflected in a disadvantageously reduced heat-storage efficiency.

Furthermore, in using PCM capsules in temperature control apparatus for use in various hothouses and the like, it is necessary to provide a separate heating unit in addition to the PCM capsules so that the shortage of heat as resulting from insufficient heating, for example in winter when the duration of sunshine is short, can be filled up. When such a heating unit is used combinedly, heat radiation from said unit can hardly extend over the whole hothouse and this readily results in lack of uniformity in temperature within the hothouse. For avoiding such trouble, a blower is required for circulating the air within the hothouse to thereby cause the heat radiated extend over the whole hothouse.

BRIEF DESCRIPTION OF THE DRAWINGS

In the accompanying drawings,

FIG. 9 illustrates the condition in which the temperature control apparatus shown in FIGS. 6–8 is used;

FIG. 10 is a cross-sectional front view of another example of the temperature control apparatus;

FIG. 11 is a cross-sectional side view of a further example of the temperature control apparatus;

DETAILED DESCRIPTION OF THE INVENTION

An object of the invention, which has been worked out to solve the problems involved in the prior art as mentioned above, is to provide a heat storage composition which consists mainly of calcium chloride hexahydrate and is capable of substantially avoiding the phenomenon of supercooling and absorbing or releasing the latent heat of solidification with certainty at a temperature around the theoretical solidification point. Another object of the invention is to provide a heat storage composition which is highly stable with respect to phase separation among the elements constituting the heat storage composition, i.e. main constituent (calcium chloride hexahydrate), nucleating agent (barium sulfide, etc.), solidification point modifier (zinc chloride, etc.) and so on, and can produce a high-level heat storage effect even in repeated use thereof. A further object of the invention is to provide a flat PCM capsule which contains the above heat storage composition in the sealed state, has an improved structure and makes it possible for the heat storage/release characteristics of the heat storage composition to be utilized efficiently. A still another object is to provide a temperature control apparatus in which said PCM capsule can be made the most of for temperature control in various hothouses and the like.

Such objects of the invention have been accomplished by providing the constitutions specified in the accompanying claims.

Figure 1:
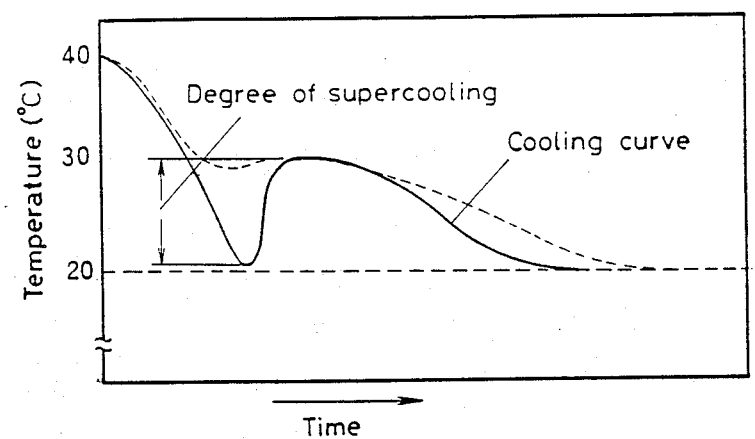
FIG. 1 graphically represents an example of the supercooling curve for the heat storage composition.

When a heat storage composition consisting substantially of calcium chloride hexahydrate alone is cooled from the molten state, it does not begin to solidify even after passage across its solidification point (about 29.5° C.) but begins to solidify rapidly at about 20° C., for instance, as indicated by the solid line in FIG. 1. The degree of such supercooling varies greatly depending on the rate of cooling and the extent of disturbance of the melt, among others, so that the temperature at which the latent heat is released cannot be specified. Accordingly, the temperature control in response to a desired temperature cannot but become imprecise. When a nucleating agent for preventing supercooling, for example strontium chloride hexahydrate, is added to the composition in an amount of about 5 percent by weight, the phenomenon of supercooling is much inhibited and the degree of supercooling is reduced to about 3°–4° C., as indicated by the broken line in FIG. 1. However, such supercooling inhibiting effect of known nucleating agents cannot be said to be fully satisfactory although the optional addition level differs only to some extent depending on the kind of the nucleating agent. Thus, it is not that supercooling can be controlled substantially within an acceptable range.

After a number of experiments with various compounds, the present inventors confirmed that the phenomenon of supercooling can be suppressed very effectively by using barium sulfide and barium chloride dihydrate combinedly in certain specific amounts. It was further found that, as will be described later in the examples, the coexistence, in a heat storage composition containing calcium chloride hexahydrate as the main component, of 0.001–5 percent of barium sulfide and 0.05–5 percent of barium chloride dihydrate can suppress the supercooling to at most 2° C. When the amount of barium sulfide or barium chloride dihydrate is lower than the lowest limit given above, the synergistic supercooling inhibiting effect arising from their combined use cannot be expected any more but only an incomplete supercooling inhibiting effect (supercooling of about 5°–6° C.) as obtainable by their single use can be produced. On the other hand, when the contents of the above two additives exceed the respective upper limits, solidification does not occur in some instances or the quantity of latent heat decreases greatly, so that the performance and stability of the heat storage material deteriorate.

In a further study, it was found that when a small amount of strontium chloride is used in combination with barium sulfide and barium chloride dihydrate, a satisfactory supercooling inhibiting effect can be secured even at a further reduced total nucleating agent addition level. In view of such excellent supercooling inhibiting effect of strontium chloride hexahydrate, it was expected that a satisfactory supercooling inhibiting effect might be still obtained even when one of barium chloride or barium sulfide is omitted, and investigations were conducted in this direction in an attempt to omit the use of barium sulfide which can be a source of hydrogen sulfide. As a result, it was found that a satisfactory supercooling inhibiting effect can be produced when strontium chloride hexahydrate and a slightly increased amount of barium chloride are used combinedly. After determination of the optimum contents of the above components, the present invention has now been completed.

Thus, in accordance with the invention, the contents of barium sulfide and the nucleating agents can be reduced to 0.0001–5 percent and 0.001–5 percent, respectively by adding 0.001–0.1 percent of strontium chloride hexahydrate as an additional nucleating agent to the whole heat storage composition, as will be detailedly described later in the examples. When strontium chloride hexahydrate is used in an amount of not less than 0.06 percent the combined use of barium chloride dihydrate alone as another nucleating agent in an amount of not less than 0.5 percent can produce a satisfactory supercooling inhibiting effect. The supercooling inhibiting effect is dependable and sufficient at very low nucleating agent addition levels if the levels of addition of the nucleating agents meet the conditions given below.

Thus, the nucleating agent contents (or addition levels), $X$ (%) for barium sulfide, $Y$ (%) for barium chloride dihydrate and $Z$ (%) for strontium chloride hexahydrate, which are preferred are as follows:

$0 \leq X \leq 5$ $0.001 \leq Y \leq 5$, $0.001 \leq Z \leq 0.1$, and

[I] when $0.06 \leq Z \leq 0.1$, then
   $X=0$ and $Y \geq 0.5$,
[II] when $0.005 \leq Z \leq 0.06$, then
   $X \geq 0.0001$ and $Y \geq 0.01$, or
[III] when $0.001 \leq Z \leq 0.005$, then
   $X \geq 0.001$ and $Y \geq 0.01$.

As mentioned above, a heat storage composition which will cause substantially no supercooling phenomenon and has an optionally selected latent heat release temperature can be obtained by incorporating into a heat storage material mainly consisting of calcium chloride hexahydrate a specific nucleating agent consisting of barium chloride and so on and further, optionally, a solidification point modifier, such as zinc chloride, potassium bromide, sodium bromide or ammonium bromide. Upon repeated use, namely after repetition of the solidification-melting cycle, even this heat storage composition may sometimes deteriorate in its performance as a result of precipitation of part of said nucleating agent or solidification point modifier as crystals. In such case, however, the dispersion stability of the whole heat storage composition can be markedly improved by incorporating into the heat storage composition an adequate amount of an ultrafine silica powder plus glycerin as a thickening agent. As said ultrafine silica powder, there may be used a high purity ultrafine silica powder, such as Aerosil (trademark) of Degussa, West Germany. Supposedly, such substance exhibits its thixotropic property owing to the action of the silanol group ($\equiv$Si—OH) which said substance has in its structure. Said substance occurs as very minute particles (7–40 $\mu$m) and is highly dispersible in various media. Thus, when incorporated into the heat storage composition, said substance is dispersed uniformly while maintaining the fine particulate state. It is presumable that, upon melting of said composition, particles of said substance are connected with one another by forming crosslinks and that, as a result, a thickening effect is produced.

Ultrafine silica powders have so far been used as thickening agents for paints or as sagging or running inhibitors for paints for thick coating of walls, among others, and their thickening effect is well known. Hithertofore, however, there have been no instances of their use as thickening agents for heat storage compositions.

The present inventors have confirmed that ultrafine silica powders produce excellent thickening effect in heat storage compositions which are in the molten state and are very stable both chemically and physically and little susceptible to different heat storage compositions or to environmental conditions, such as heat. Thus, addition in relatively small amounts of an ultrafine silica powder as a thickening agent together with glycerin to a heat storage composition whose main component is an inorganic substance in a hydrate form and which may optionally contain a solidification point modifier and/or a nucleation promoting agent gives a necessary and sufficient viscosity. Moreover, an ultrafine silica powder does not aggregate or cake or otherwise degrade even after repetition of the heat storage-release cycle. Furthermore, the addition of glycerin does not affect the solidification point since a low level of addition of glycerin is already sufficient. Therefore, the heat storage composition with an ultrafine silica powder and glycerin incorporated therein as thickening agents exhibits excellent repetition stability, reveals no ununiform dispersion or phase separation phenomenon, and can maintain a high level of dispersion stability for a prolonged period of time.

The flat PCM capsule according to the invention which has been improved so that the characteristic features of the above heat storage composition can be utilized therein effectively and efficiently.

Figure 2:
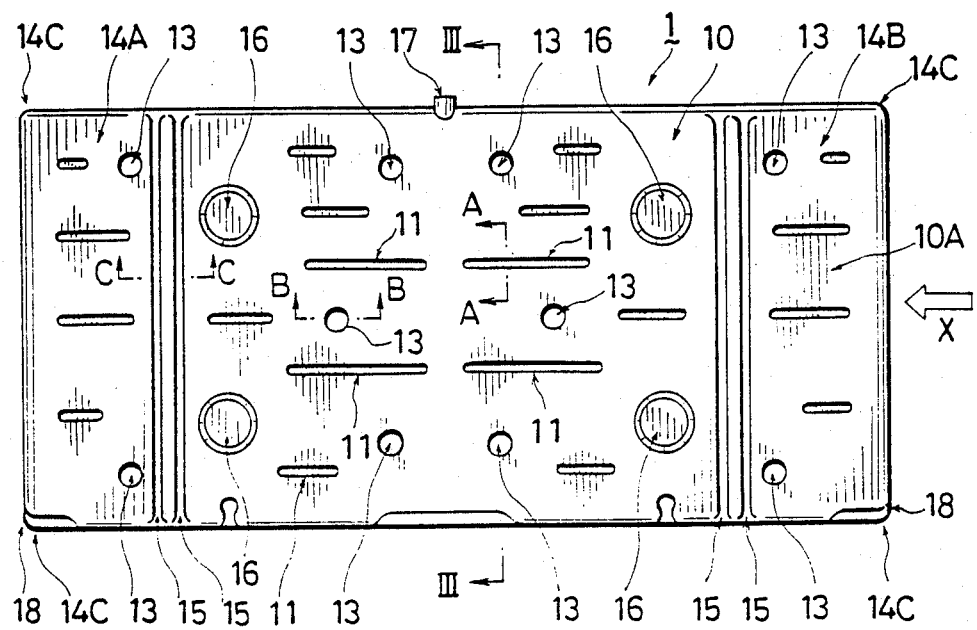
FIG. 2 is a plan view illustrating an example of the heat storage capsule according to the invention.
Figure 3:
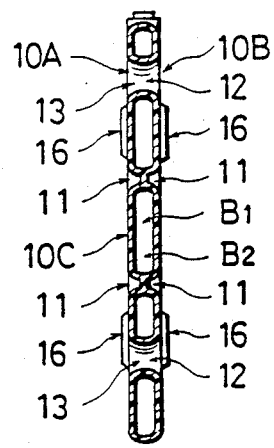
FIG. 3 is a cross-sectional view of said example as seen along the line III—III in FIG. 2.
Figure 4A:
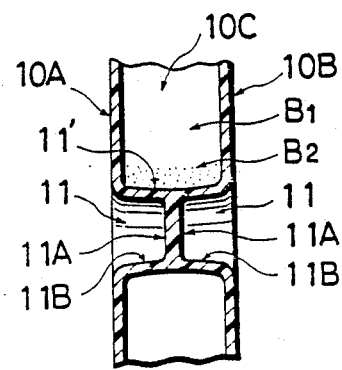
FIG. 4 shows enlarged partial cross-sectional views of said example, FIG. 4A along the line A—A, FIG. 4B along the line B—B, and FIG. 4C along the line C—C in FIG. 2.
Figure 4B:
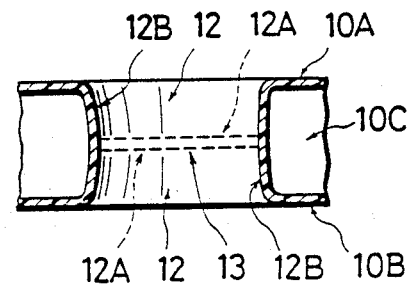
Figure 4C:
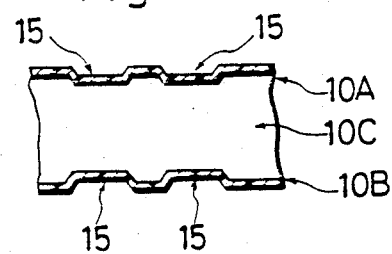

FIG. 2 is a plan view illustrating an example of the heat storage capsule according to the invention; FIG. 3 is a cross-sectional view of said example as seen along the line III—III in FIG. 2; and FIG. 4 shows partial cross-sectional views of said example, FIG. 4A along the line A—A, FIG. 4B along the line B—B, and FIG. 4C along the line C—C in FIG. 2.

The flat PCM capsule 1 according to the invention comprises a rectangular plate-like hollow vessel 10 generally formed by blow molding. The vessel 10 has a plurality of oblong recesses 11, surrounded by slant faces 11B and 12B, as formed by bonding together by fusion the bottoms 11A and 12A at corresponding sites on both face plates 10A and 10B (FIG. 3) and also a plurality of circular holes 13 formed by fusion bonding in the same manner as above to form circular recesses 12 followed by punching at least at the fused bottom of said circular recesses 12. The circular holes 13 thus pass through the hollow vessel in the thickness direction thereof. In the neighborhood of each of the left and right edge portions 14A and 14B (as viewed on the drawing; the same shall apply hereinafter) of each face plate, the hollow vessel has at least one groove-like recess 15 continuously extending in the longitudinal direction. In the neighborhood of each of the four corners 14C—14C, there is provided a protrusion 16. The four protrusions 16 on each face plate serve as spacers and are located at sites corresponding to the protrusions on the other face plate (FIG. 3). The vessel is sealable after charging the hollow space 10C with a latent heat storage composition $B_1$ containing a nucleating agent $B_2$ etc.

In FIG. 2, 17 indicates an inlet for the latent heat storage composition $B_1$. After charging, the inlet is hermetically closed by thermal fusion or stoppering.

Figure 18:
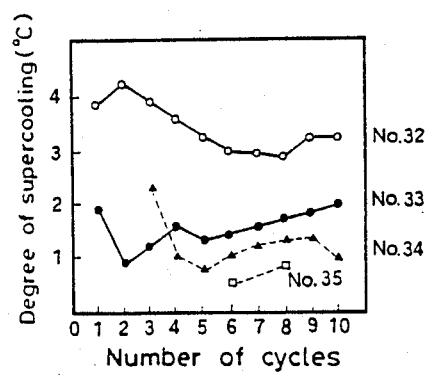

In FIG. 2, 18—18 indicate compressed portions at the corners of the flat PCM capsule 10, which are to serve as fenders for preventing breakage of the PCM capsule due to collision with some other body and also to serve to avoid formation of narrow areas within the inside space. On the drawing, the compressed portions 18 are found only at the bottom corners although such may be provided at all the four corners.

Figure 5:
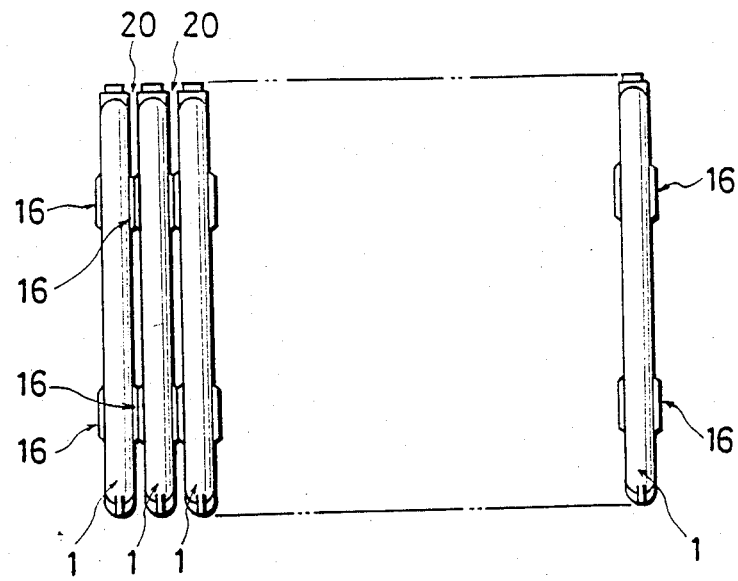
FIG. 5 illustrates the condition in which heat storage capsules according to the invention are used.

In practical use, plural units of this flat PCM capsule 1—1 are vertically disposed in parallel with one another, as shown in FIG. 5. On that occasion, every two neighboring capsules, owing to butting of their spacing protrusions 16—16, leave a space 20 therebetween so that air can be forcedly circulated through this space.

Within the hollow vessel 10 in the flat PCM capsule 1, each oblong recess 11 forms a shelf 11' [FIG. 4A], so that the nucleating agent $B_2$ and other additives can deposit on such shelf 11'. As a result, concentrated local accumulation of such additives can be prevented and heat storage can be performed effectively. Furthermore, the presence of the holes 13 makes the flow of air complicated and this leads to an increase in effective heat exchange surface area.

Even when dew condensation occurs on the surface of the PCM capsule 1 due to a temperature difference relative to the ambient temperature, the condensate water is put aside by the air blown under forced circulation in the direction indicated by the arrow x and eventually arrives at the grooves 15, 15 and flows down therein without difficulty. Similarly, when dew condensation occurs in the recesses 11 and 12, the condensate water readily flows down the recess inside surface which is slanting, whereby the condensate water retention is effectively inhibited.

Figure 27:
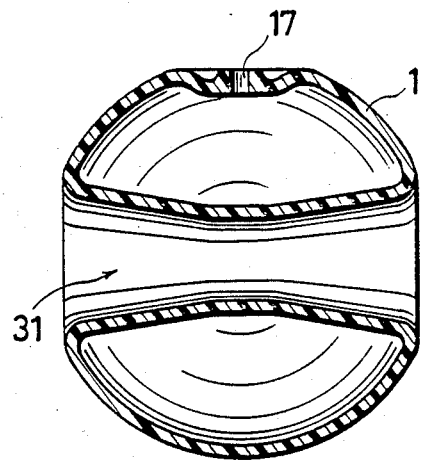
FIGS. 27–30 each is a cross-sectional elevation view of a further example of the heat storage capsule according to the invention.
Figure 28:
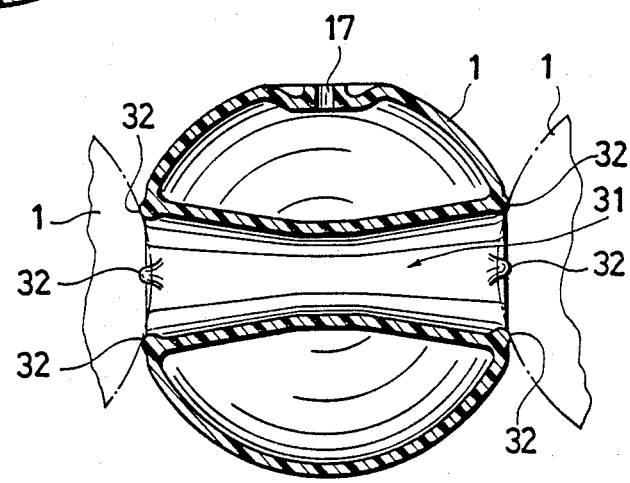
Figure 29:
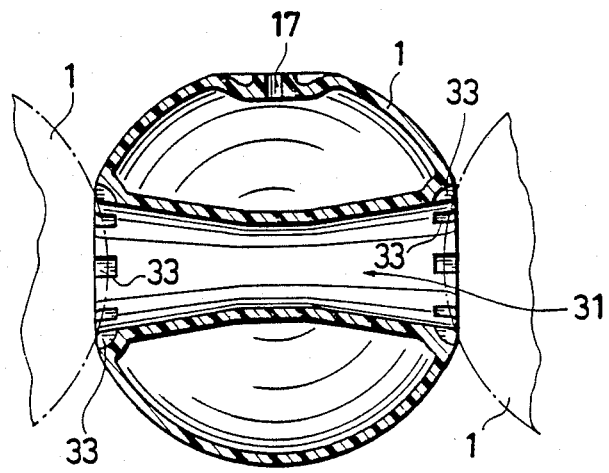

FIG. 27 illustrates in section a further example of the heat storage capsule according to the invention. As shown, this type of capsule 1 has a hollow doughnut-like configuration, with a through hole 31 passing approximately the center of a hollow spherical vessel. Said vessel is charged with the above-mentioned heat storage composition through an inlet 17. The inner and outer wall segments of said doughnut-like hollow vessel serve as heat transfer walls for accumulation or release of heat. Said vessel 1 has a diameter of about 5-20 cm, for instance. A plurality of capsules of this type are disposed in a heat storage unit and a heat exchange medium is passed through said unit for effecting accumulation or release of heat. In this case, either opening portion of the through hole 31 of a capsule 1 may be stopped up by a neighboring capsule coming into close contact therewith and such stoppage may result in decrease in heat accumulation or release efficiency as a result of inhibition of the flow of the heat exchange medium (fluid) through said through hole 31. To avoid such problem, it is desirable to provide, as shown in FIG. 28 (cross-sectional view), a plurality of protrusions 32 on the periphery of each opening portion of the through hole 31 or provide, as shown in FIG. 29, a plurality of grooves 33 on the periphery of each opening portion of the through hole 31 so that even when both the opening portions of the through hole 31 are in contact with neighboring capsules 1, openings or spaces can remain for the passage of the heat exchange medium. The above protrusions 32 or grooves 33 may vary in shape, size and other aspects in an optional manner provided that the intention of securing spaces for fluid passage can be accomplished.

When the capsule is in the doughnut-shaped form as shown, the inner face forming the through hole 31 as well as the outer face of the hollow doughnut-shaped vessel serves as the heat transfer wall, so that high heat storage-release efficiency can be obtained.

Figure 30:
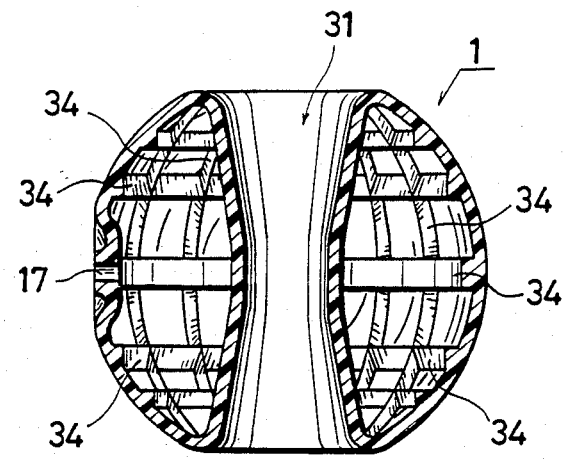

It is desirable to provide such spherical capsule with a plurality of rib-like protrusions 34 on the inner wall of the heat storage composition-receiving room of the hollow spherical vessel 1, for example as shown in FIG. 30. Said rib-like protrusions 34 each functions as the above-mentioned shelf to thereby prevent the localized deposition of the nucleating agent and so on more effectively.

Figure 31:
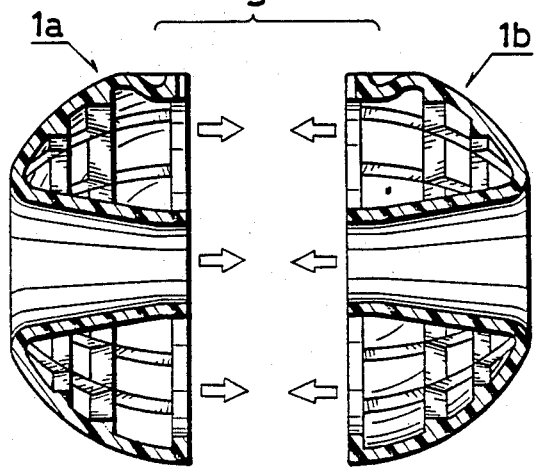
FIG. 31 is a schematic view in section which illustrates a technology of manufacturing the heat storage capsule shown in FIG. 30.

Such hollow spherical vessel can be formed by blow molding or the like technique so far known in the art. In molding a hollow spherical vessel having rib-shaped protrusions 34 on the inner wall of the heat storage composition-receiving room as shown in FIG. 30, it is convenient to produce intermediate halves 1a and 1b of said vessel, as shown in FIG. 31, and then unite said intermediate halves together by adhesion or welding.

Figure 32A:
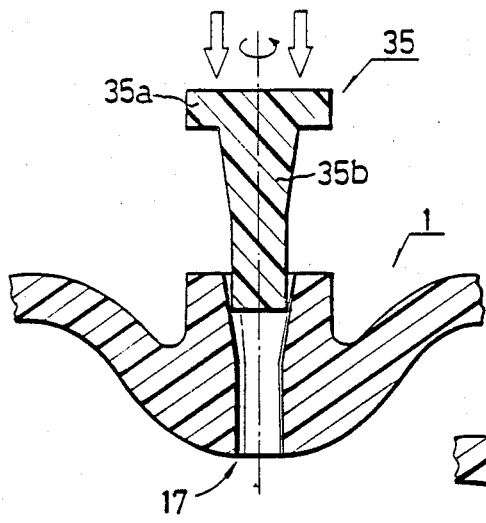
FIGS. 32A and 32B are enlarged partial cross-sectional views which schematically illustrate a fit-fusion technique as applied to the inlet after heat storage composition charging.
Figure 32B:
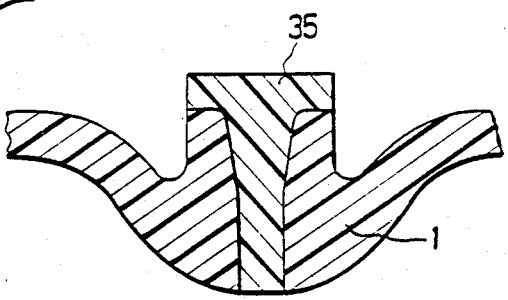

Meanwhile, most generally, the heat storage composition is melted by heating and then introduced in the liquid form into a hollow vessel such as mentioned above through an inlet 17, which, after charging, is tightly stoppered. An advisable stoppering means is as follows: As shown in FIG. 32A and FIG. 32B, which are enlarged cross-sectional partial views schematically illustrating an example of the means of tightly stoppering the inlet 17, the inlet 17 is formed such that the opening end slightly protrudes and shows a gradual expansion toward the exterior. The stopper 35, which is formed like a wine bottle stopper, preferably, comprises a disk segment 35a and a rod segment 35b formed solidly with said disk segment 35a and protruding from the middle of said disk segment. (said rod segment being capable of exactly fitting the above-mentioned inlet 17 and the length of said rod segment 35b being almost equal to the depth of the inlet). For fitting and fusion together between the inlet 17 and stopper 35, said stopper 35 is pushed into the inlet 17 while it is rotated at high velocity, as shown in FIG. 32A. The portions of the stopper 35 and inlet 17 which are in contact with each other are welded together as a result of friction heating. After cooling, there can be achieved complete closure of the inlet, as shown in FIG. 32B. Such means of hermetically closing the inlet 17 can be applied not only to hollow spherical vessels but also to flat vessels such as the one shown in FIG. 2 for preventing leakage of the heat storage composition without fail. As another means of effecting fit-welding, the technique comprising melting the fitting surface of each of the inlet 17 and stopper 35 by heating and quickly fitting the stopper into the inlet can also be employed. It goes without saying that the means of closure by fusion such as mentioned above is applicable to those cases in which a thermoplastic material such as a synthetic resin is used as the vessel material.

Figure 33A:
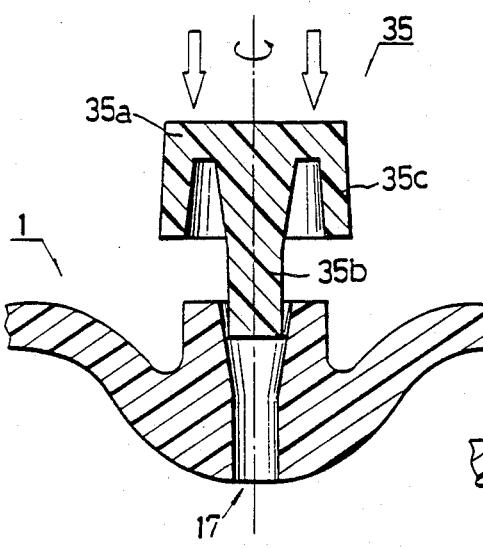
FIGS. 33A and 33B are enlarged partial cross-sectional views which schematically illustrate another fit-fusion technique as applied to the inlet after charging of a heat storage composition.
Figure 33B:
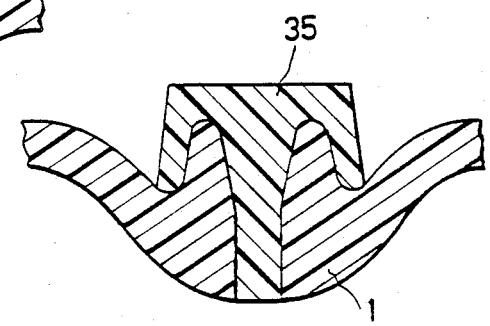

FIGS. 33A and 33B, which are enlarged partial cross-sectional views, illustrate another fit-fusion technique. The stopper 35 has a ring-shaped protrusion 35c on that side of the disk segment 35a which carried the rog segment 35b. The fit-fusion welding is conducted in the same manner as illustrated in FIGS. 32A and 32B.

When such means is employed, the circumferential surface of the rod segment 35b, the lower surface of the disk segment 35a and the inner circumferential surface of the ring-shaped protrusion 35c are all fusion-bonded to the opening wall of the inlet 17, so that an increased sealing length can be attained, hence the sealing effect can be further heightened.

The latent heat storage capsule according to the invention is such a flat or doughnut-shaped capsule as mentioned above with a heat storage composition contained therein. Said heat storage composition may be of any kind. However, a heat storage composition having such a specific composition as defined above in accordance with the invention, when used in combination with a capsule having such geometric characteristics as mentioned above, gives a very good latent heat storage capsule with which the excellent heat storage-release characteristics of the heat storage composition as well as the geometric characteristics of the capsule body can be exhibited effectively.

A temperature control apparatus in which a plurality of latent heat storage capsules such as mentioned above are used is now described taking as an example the case in which flat PCM capsules are used.

Figure 6:
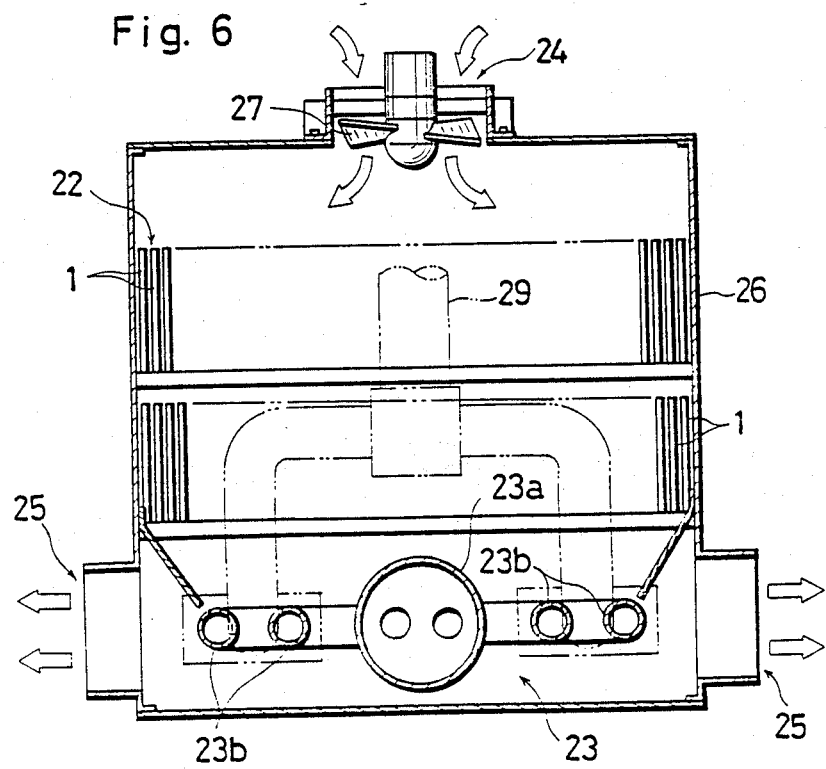
FIG. 6 is a cross-sectional front view showing an example of the temperature control apparatus according to the invention.
Figure 7:
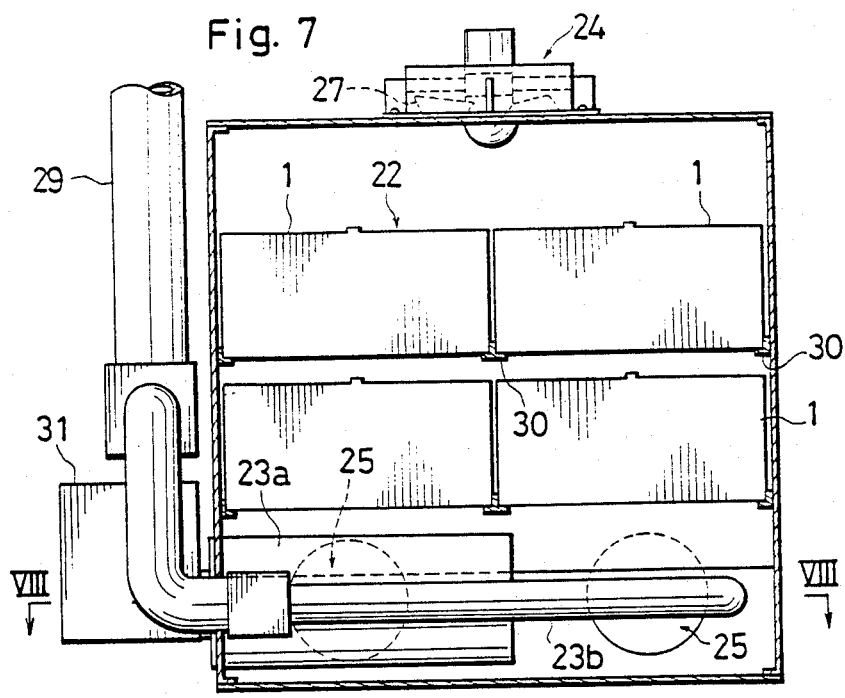
FIG. 7 is a cross-sectional side view of the apparatus shown in FIG. 6.
Figure 8:
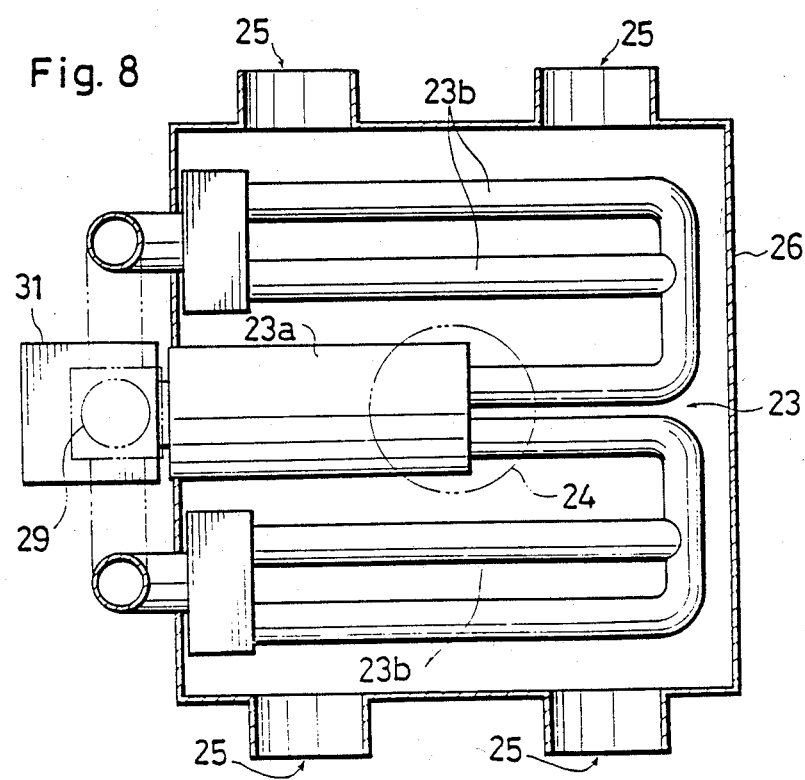
FIG. 8 is a cross-sectional view of the same apparatus as seen along the line VIII—VIII in FIG. 7.

FIGS. 6-8 illustrate an example of the temperature control apparatus in which flat PCM capsules with the above-mentioned heat storage composition sealed therein are built in. FIG. 6 is a cross-sectional front view, FIG. 7 a cross-sectional side view, and FIG. 8 a cross-sectional view as seen along the line VIII—VIII in FIG. 7. In this temperature control apparatus, a heat storage unit 22 comprises upper and lower rows of flat PCM capsules 1 each containing the heat storage composition according to the invention. In each row, the capsules are arranged in the vertical standing position and in parallel with one another in a holding frame 20, with a space for air passage retained between any two horizontally neighboring capsules. This heat storage unit 22 and a heating unit 23, which comprises a burning unit 23a and a pipe-made heat exchange unit 23b, are built in a hollow housing 26 provided with an air inlet 24 on the top and four air outlets 25 in the lowermost part. A fan-type blower 27 is provided at said air inlet 24 so that air outside the housing can be introduced into the housing through the air inlet 24 and, after passage through said heat storage unit 22 and said heating unit 23, sent out of the housing via the air outlets 25. This temperature control apparatus is placed, as shown in FIG. 9 which illustrates how to use it, within a hothouse 28 or the like for cultivating various farm products such as tomato an melon, which is a plastic film house or a glasshouse, for instance. The chimney 29 of the heating unit 23 is arranged such that it protrudes out of the hothouse 28 for allowing the waste combustion gas to go out of the house. In this way, the inside temperature of the hothouse 28 is controlled.

Thus, the air within the hothouse is circulated through the inside and outside of the apparatus housing 26 by means of the blower 27. During shining hours, solar energy is supplied to the heat storage unit 22 via the air within the hothouse and each heat storage capsule 1 absorbs and stores that portion of solar energy which remains after heating of the hothouse to thereby maintain the temperature within the hothouse at an adequate level. After sunset, the air in the hothouse is heated within the apparatus 26 by the heat storage capsules 1 so that the hothouse temperature can be maintained at an adequate level. In case heating by the heat storage unit 22 is insufficient, an oil burner 21 is automatically or manually actuated so that the hothouse air introduced into the apparatus 26 can be heated by means of the heating unit 23 to thereby mean the hothouse temperature at an adequate level.

As shown in FIG. 6 and FIG. 7, the above heating unit is disposed downstream (with respect to the air current caused by the blower 27) from the heat storage unit 22, so that the air heated by the heating unit 23 will not pass through the heat storage unit 22 or, in other words, the air will leave the apparatus 26 without temperature fall due to heat absorption by the heat storage capsules 1.

In this way, it is now possible to conduct the hothouse heating in case of insufficient heating by the heat storage unit efficiently with a minimum heat loss in the heat storage unit while suppressing the unevenness in temperature to a possible minimum by means of the blower. In addition, the blower can be used for both heat-storing and heating purposes and therefore the apparatus is advantageous from both the structural and cost viewpoints.

In designing the temperature control apparatus, other constructions than that shown in FIGS. 5-8 may also be employed, for example the construction shown in FIG. 10 in which the lower set of heat storage capsules 1 involves only one row or the construction shown in FIG. 11 in which the air inlet 24, heat storage unit 22, heating unit 23 and air outlet 25 are arranged in parallel as viewed in the horizontal direction.

The following examples of the heat storage composition which is the most fundamental constituent element in the present invention, together with background experimental data which are the bases for establishing the relevant parameters, illustrate the invention in more detail.

EXAMPLES

Experiment series 1

Figure 12:
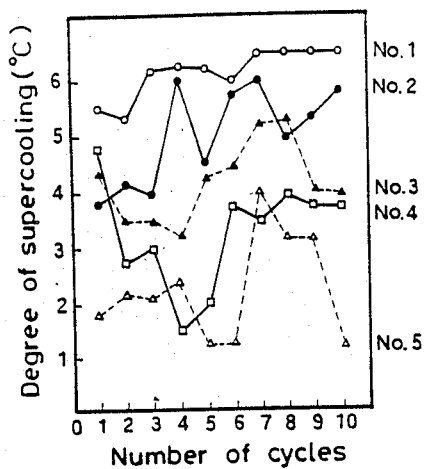
FIGS. 12–21 each is a graphical representation of the degree of supercooling in a heat storage composition according to the invention.
Figure 13:
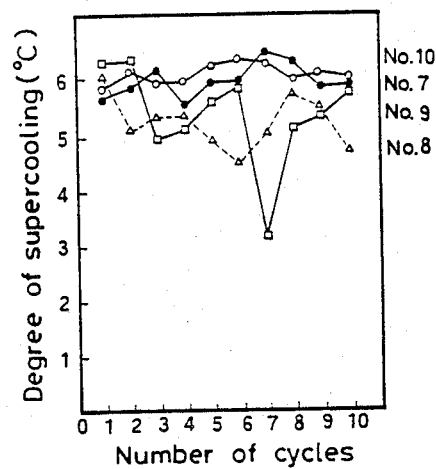
Figure 14:
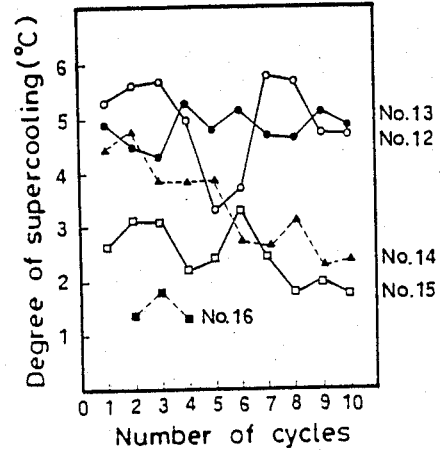
Figure 15:
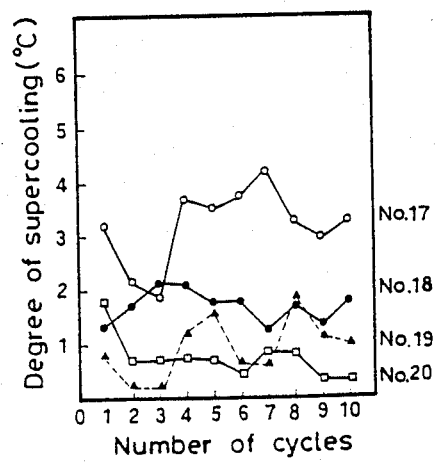
Figure 16:
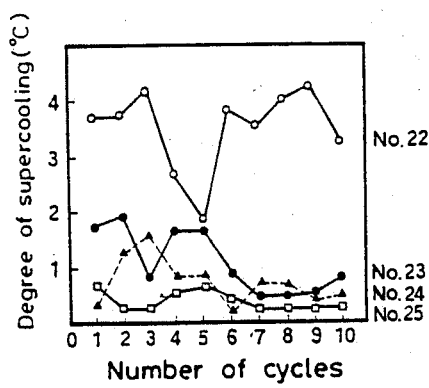
Figure 17:
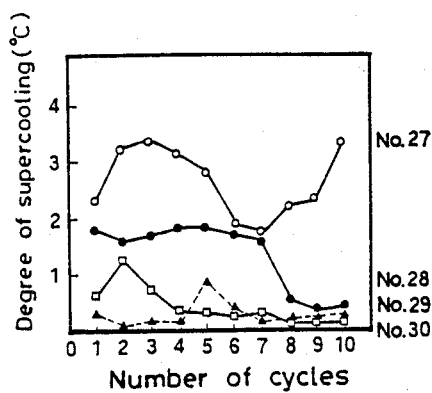

The supercooling inhibiting effects of barium sulfide and barium chloride dihydrate each added alone as a nucleating agent to calcium chloride hexahydrate, as shown Tables 1 and 2, are shown in FIG. 12 and FIG. 13, respectively. In the experiments, 0.001-10 percent of barium sulfide or barium chloride dihydrate was added to calcium chloride hexahydrate and each heat storage composition was tested for the degree of supercooling (cf. FIG. 1) by repeating the melting-solidification cycle.

TABLE 1

| Some compositions with BaS as the nucleating agent | | |
|---|---|---|
| Experiment No. | BaS (%) | $CaCl_2.6H_2O$ (%) |
| 1 | 0.001 | Balance |
| 2 | 0.01 | " |
| 3 | 0.1 | " |
| 4 | 1 | " |
| 5 | 5 | " |
| 6 | 10 | " |

TABLE 2

| Some compositions with $BaCl_2.2H_2O$ as the nucleating agent | | |
|---|---|---|
| Experiment No. | $BaCl_2.2H_2O$ (%) | $CaCl_2.6H_2O$ (%) |
| 7 | 0.01 | Balance |
| 8 | 0.1 | " |
| 9 | 1 | " |

TABLE 2-continued

| Some compositions with $BaCl_2.2H_2O$ as the nucleating agent | | |
|---|---|---|
| Experiment No. | $BaCl_2.2H_2O$ (%) | $CaCl_2.6H_2O$ (%) |
| 10 | 5 | " |
| 11 | 10 | " |

As is apparent from FIG. 12 and FIG. 13, the single use of BaS or $BaCl_2.2H_2O$ cannot produce a satisfactory supercooling inhibiting effect. In the above experiments, the nucleating agent contents in composition No. 6 and No. 11 were too large, namely these compositions did not solidify at their respective proper solidification points at all, hence could not be used as heat storage compositions.

In the next place, the supercooling inhibiting effect of the combined use of barium sulfide and barium chloride dihydrate each in an appropriate amount was examined. Thus, as shown in Table 3, heat storage compositions were prepared in which the contents of barium sulfide and barium chloride dihydrate were varied, and they were tested for the degree of supercooling by repeating the melting-solidification cycle.

TABLE 3

| Some compositions containing BaS + $BaCl_2.2H_2O$ combinedly | | | |
|---|---|---|---|
| Experiment No. | BaS (%) | $BaCl_2.2H_2O$ (%) | $CaCl_2.6H_2O$ (%) |
| 12 | 0.0005 | 0.001 | Balance |
| 13 | 0.001 | | |
| 14 | 0.1 | | |
| 15 | 5 | | |
| 16 | 10 | | |
| 17 | 0.0005 | 0.05 | Balance |
| 18 | 0.001 | | |
| 19 | 0.1 | | |
| 20 | 5 | | |
| 21 | 10 | | |
| 22 | 0.0005 | 0.1 | Balance |
| 23 | 0.001 | | |
| 24 | 0.1 | | |
| 25 | 5 | | |
| 26 | 10 | | |
| 27 | 0.0005 | 5 | Balance |
| 28 | 0.001 | | |
| 29 | 0.1 | | |
| 30 | 5 | | |
| 31 | 10 | | |
| 32 | 0.0005 | 10 | Balance |
| 33 | 0.001 | | |
| 34 | 0.1 | | |
| 35 | 5 | | |
| 36 | 10 | | |

The results obtained are shown in FIGS. 14-18. In the figures, the numbers correspond to the experiment numbers given in Table 3. The results of these experiments suggest:

(1) That when the barium sulfide addition level is less than 0.001 percent, the supercooling inhibiting effect is not sufficient even when the barium chloride dihydrate addition level is in a proper range and that, conversely, when the barium sulfide addition level exceeds 5 percent, solidification may not take place in some instances (Experiment No. 21, No. 26, No. 31 and No. 36) and, even if solidification occurs, the latent heat of solidification becomes reduced and the performance of the relevant composition as a heat storage material becomes markedly decreased.

(2) That when the barium chloride dihydrate addition level is less than 0.05 percent, any synergistic supercooling inhibiting effect cannot be produced in its combined use with barium sulfide, the degree of supercooling always exceeding 2°–3° C. That when the barium chloride dihydrate content exceeds 5 percent, solidification does not occur in some cases like in the case of excessive barium sulfide content. It was further confirmed that even when solidification occurs, the latent heat of solidification becomes markedly small.

(3) That, on the contrary, the use of barium sulfide and barium chloride dihydrate each in an adequate amount results in synergistic increase in their supercooling effect and, as a result, the degree of supercooling can be limited to at most 2° C. in any case.

Now, the results of experiments which serve to confirm the effect of strontium chloride hexahydrate as the nucleating agent are described.

Heat storage compositions in which the content of strontium chloride hexahydrate was varied as shown in Table 4 were prepared and examined for the supercooling inhibiting effect.

TABLE 4

| | Some compositions with $SrCl_2.6H_2O$ as the nucleating agent | |
|---|---|---|
| Experiment No. | $SrCl_2.6H_2O$ (%) | $CaCl_2.6H_2O$ (%) |
| 37 | 1.0 | Balance |
| 38 | 0.1 | " |
| 39 | 0.05 | " |
| 40 | 0.01 | " |
| 41 | 0.005 | " |

Figure 19:
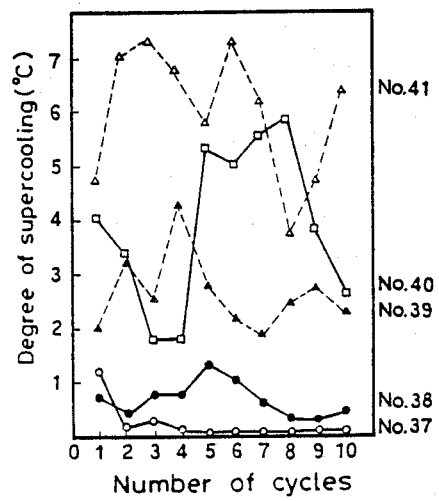

As seen from the results shown in FIG. 19, for securing a satisfactory supercooling effect, strontium chloride hexahydrate must be used in an amount of not less than 0.1 percent.

Example 1

Based on the above experimental results, it was considered that when strontium chloride hexahydrate is used combinedly with the above barium sulfide and/or barium chloride dihydrate, the content of each of these nucleating agents might be further reduced. Accordingly, the supercooling inhibiting effect was studied for cases in which these three were used combinedly. Thus, heat storage compositions in which the contents of the above three nucleating agents were varied each in a lower addition level range, as shown in Table 5, were prepared and examined for the supercooling inhibiting effect.

TABLE 5

| | Some compositions containing BaS + $BaCl_2.2H_2O$ + $SrCl_2.6H_2O$ combinedly | | | |
|---|---|---|---|---|
| Experiment No. | BaS (%) | $BaCl_2.2H_2O$ (%) | $SrCl_2.6H_2O$ (%) | $CaCl_2.6H_2O$ (%) |
| 42 | 0.0001 | 0.01 | 0.01 | Balance |
| 43 | 0.0001 | 0.01 | 0.05 | " |
| 44 | 0.001 | 0.01 | 0.0005 | " |
| 45 | 0.001 | 0.01 | 0.001 | " |
| 46 | 0.001 | 0.01 | 0.01 | " |
| 47 | — | 0.5 | 0.05 | " |
| 48 | — | 0.5 | 0.06 | " |
| 49 | — | 0.4 | 0.06 | " |
| 50 | — | 1.0 | 0.06 | " |

Figure 20:
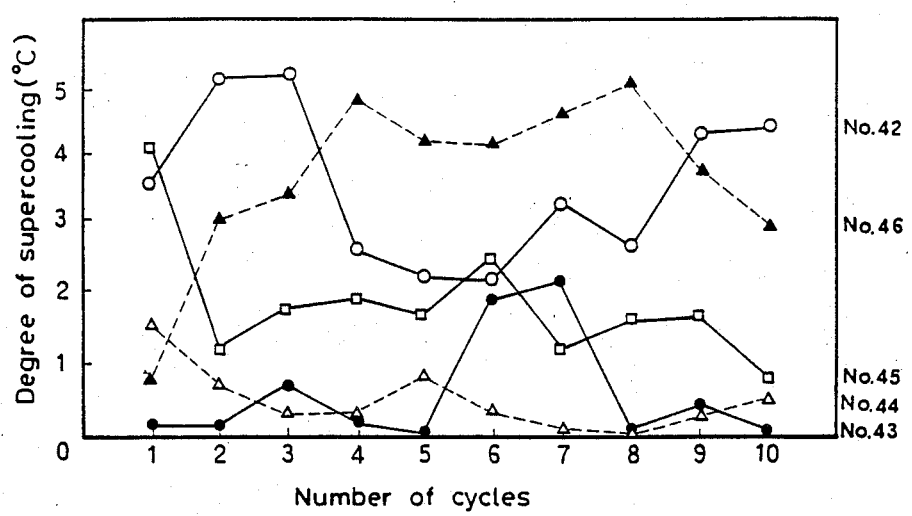
Figure 21:
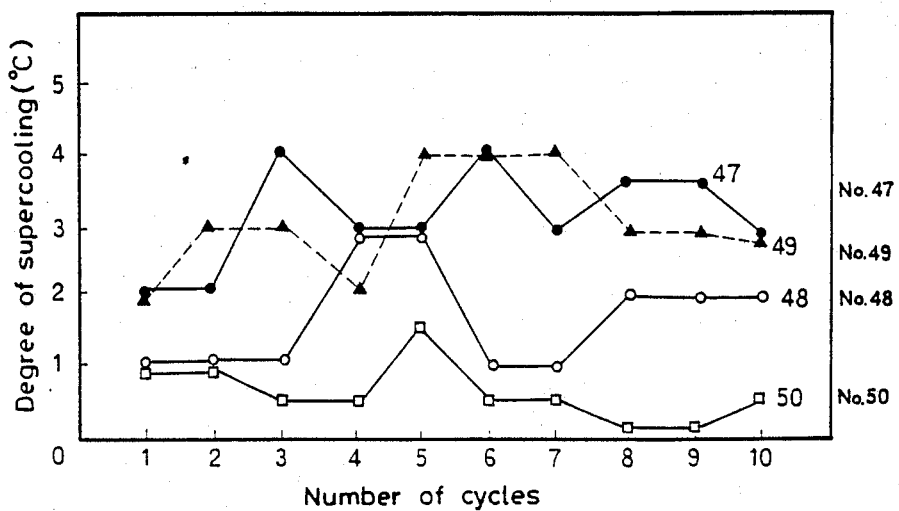

The result obtained are shown in FIG. 20 and FIG. 21. As is evident from FIG. 20, the combined use of the above three nucleating agent can reduce to a significant extent the addition levels or contents of the respective agents as required for securing the desired supercooling inhibiting effect as compared with the single use thereof or the combined use of two of them. As FIG. 20 indicates, it is advisable that when the amount of strontium chloride hexahydrate is rather small (0.001–0.05 percent), the amount of barium sulfide should be increased to some extent (not less than 0.001 percent). When strontium chloride dihydrate is used in a relatively large amount (0.01–0.05 percent), a satisfactory supercooling effect can be obtained even at a relatively low barium sulfide addition level (not less than 0.0001 percent). Furthermore, the data shown in FIG. 21 indicate that when strontium chloride hexahydrate is used in a relatively large amount (0.06–0.1 percent) and barium chloride dihydrate is used combinedly in an amount of not less than 0.5 percent, a satisfactory supercooling inhibiting effect can be obtained even in the absence of barium sulfide. After all, an excellent supercooling inhibiting effect can be obtained by using the three nucleating agents in small amounts and adjusting their addition levels such that the above conditions [I], [II] and [III] are satisfied.

Whereas the synergistic supercooling inhibiting effect producible by barium sulfide, barium chloride dihydrate and strontium chloride hexahydrate in heat storage compositions whose main component is calcium chloride hexahydrate is as above mentioned, it is usual in practical use of heat storage compositions to further use a thickening agent and/or a solidification point modifier combinedly. Therefore, several typical examples of the heat storage composition which contain these additive components are given below, together with the solidification point and the degree of supercooling (means of 10 repeated cycles) for each composition. As regards the solidification point modifier, detailed mention will be made later in describing a further experiment series.

| (A) | Main component | $CaCl_2.6H_2O$: | balance |
| | Solidification point modifier | $ZnCl_2$: | 10% |
| | Nucleating agent | BaS: | 0.0001% |
| | | $BaCl_2.2H_2O$: | 0.5% |
| | | $SrCl_2.6H_2O$: | 0.04% |
| | Thickening agent | glycerin: | 3% |
| | Solidification point: | | 20° C. |
| | Degree of supercooling: | | 0.7° C. |
| (B) | Main component | $CaCl_2.6H_2O$: | balance |
| | Solidification point modifier | NaBr: | 10% |
| | Nucleating agent | BaS: | 0.001% |
| | | $BaCl_2.2H_2O$: | 0.3% |
| | | $SrCl_2.6H_2O$: | 0.03% |
| | Thickening agent | | |
| | Ultrafine silica powder: | | 2.5% |
| | Solidification point: | | 24° C. |
| | Degree of supercooling: | | 1.5° C. |
| (C) | Main component | $CaCl_2.6H_2O$: | balance |
| | Solidification point modifier | $NH_4Br$: | 12% |
| | Nucleating agent | BaS: | 0.0001% |
| | | $BaCl_2.2H_2O$: | 0.05% |
| | | $SrCl_2.6H_2O$: | 0.04% |
| | Thickening agent | | |
| | Ultrafine silica powder: | | 2.5% |
| | Solidification point | | 15° C. |
| | Degree of supercooling: | | 1.8° C. |
| (D) | Main component | $CaCl_2.6H_2O$: | balance |
| | Solidification point modifier | KBr: | 15% |
| | Nucleating agent | BaS: | 0.1% |
| | | $CaCl_2.2H_2O$: | 0.05% |
| | | $SrCl_2.6H_2O$: | 0.04% |
| | Thickening agent | CMC: | 4% |
| | Solidification point: | | 18° C. |

|     |                             |                                                          |         |
| --- | --------------------------- | -------------------------------------------------------- | ------- |
|     | Degree of supercooling:     |                                                          | 0.7° C. |
| (E) | Main component              | CaCl$_2$.6H$_2$O:                                        | balance |
|     | Solidification point modifier | NH$_4$Br:                                              | 10%     |
|     | Nucleating agent            | BaCl$_2$.2H$_2$O:                                        | 0.65%   |
|     |                             | SrCl$_2$.6H$_2$O:                                        | 0.07%   |
|     | Thickening agent            |                                                          |         |
|     | Ultrafine silica powder:    |                                                          | 2.5%    |
|     | Solidification point:       |                                                          | 18° C.  |
|     | Degree of supercooling:     |                                                          | 1° C.   |

Experiment series 2

Figure 22:
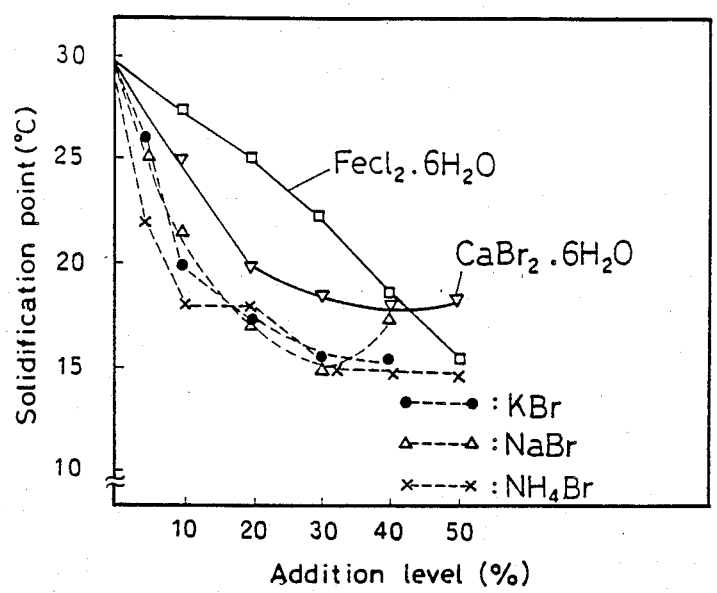
FIG. 22 is a graphical representation of the relationship between the level of addition of a solidification point modifier and the solidification points.
Figure 23:
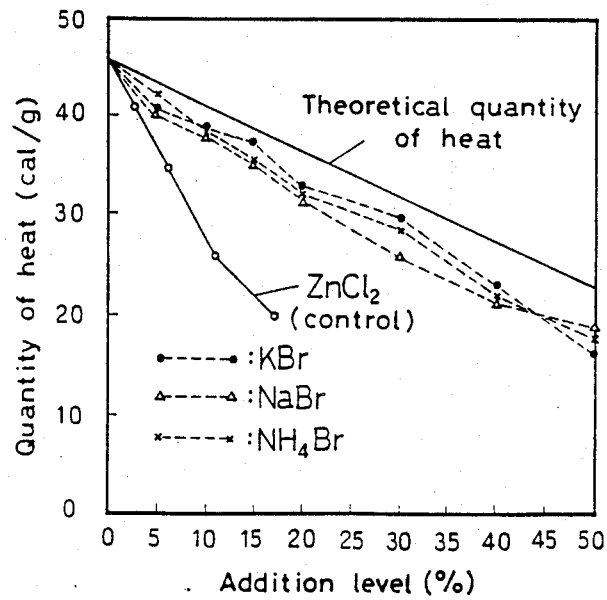
FIG. 23 is a graphical representation of the relationship between the level of addition of a solidification point modifier and the quantity of heat stored.

FIG. 22 is a graphic representation of the tendency toward depression of the solidification point of a heat storage composition whose main component is calcium chloride hexahydrate and which contains as a solidification point modifier 5–50 percent of ferric chloride hexahydrate, calcium bromide hexahydrate, potassium bromide, sodium bromide or ammonium bromide. As is evident from this figure, it is possible to adjust the solidification point as desired within the range of about 30° C. and about 15° C. by using potassium bromide, sodium bromide or ammonium bromide, selected as a preferred solidification point modifier according to the invention, at an addition level lower than the addition levels for the conventional solidification point modifiers (e.g. ferric chloride hexahydrate, calcium bromide hexahydrate). As mentioned earlier herein, an increasing amount of a solidification point modifier shows a tendency toward decrease in the quantity of latent heat of the heat storage composition itself, while the quantity of latent heat in the use temperature range is essentially required to be large for a composition to be an excellent heat storage composition. However, to lower the solidification point of a eutectic mixture directly leads to a decreased potential energy of the eutectic mixture, so that, essentially, a decrease in the quantity of latent heat cannot be avoided. Thus, the essential problem is by what means the decrease in the quantity of latent heat which accompanies solidification point depression should be minimized. The above-mentioned bromides are smaller in the quantity of latent heat as compared with the conventional solidification point modifiers, hence can serve to adjust the solidification point as desired without causing significant deterioration in the performance of the heat storage composition. FIG. 23 shows the change in the quantity of latent heat in a heat storage composition, whose main component is calcium chloride hexahydrate, with a varying amount of each of the above three bromides as added to said composition, in comparison with theoretical values calculated on the basis of the heat of fusion for calcium chloride hexahydrate (45.6 cal/g) add with a conventional modifier (zinc chloride). As is evident from FIG. 23, when the above bromides are incorporated, the latent heat values differ little from the theoretical values at various addition levels. On the contrary, in the case of the conventional modifier (zinc chloride), the tendency toward decrease in the quantity of latent heat as compared with the theoretical values is remarkable and, when compared at an equal addition level, the latent heat is much less as compared with the bromides. Moreover, the difference therebetween increases with the increase in the addition level. What has been mentioned above may be summarized in Table 6. Table 6 shows the addition levels required to adjust the solidification point to 20° C. and the latent heat quantities at said solidification point for the above bromides and some typical conventional modifiers (ferric chloride hexahydrate, magnesium chloride hexahydrate and cobalt chloride hexahydrate). As is evident from Table 6, potassium bromide, sodium bromide and ammonium bromide can give the desired solidification point in about one third of the addition levels required for the conventional solidification point modifiers and the latent heat quantities at said temperature for the bromides are 1.5- to 2-fold larger as compared with the conventional compositions. Thus, the use of at least one of potassium bromide, sodium bromide and ammonium bromide in accordance with the invention can give a heat storage composition having an optionally chosen solidification point with a high level of latent heat quantity.

TABLE 6

|       | Solidification point modifier | Addition level required to adjust the solidification point to 20° C. (%) | Latent heat cal/g |
| ----- | ----------------------------- | ------------------------------------------------------------------------ | ----------------- |
| Invention | Potassium bromide         | 9–12                                                                     | ca. 41            |
|       | Sodium bromide                | 10–15                                                                    | ca. 34            |
|       | Ammonium bromide              | 7–10                                                                     | ca. 40            |
| Prior art | Ferric chloride hexahydrate | 28–30                                                                  | ca. 23            |
|       | Magnesium chloride hexahydrate | 30–33                                                                 | ca. 25            |
|       | Cobalt chloride hexahydrate   | 32–33                                                                    | ca. 21            |

TABLE 7

|             | Composition                  | (1)      | (2)       | (3)      |
| ----------- | ---------------------------- | -------- | --------- | -------- |
| Basic composition | Calcium chloride hexahydrate | Balance  | Balance   | Balance  |
|             | Zinc chloride                | 12%      | 12%       | 12%      |
|             | Disodium hydrogen phosphate  | 3%       | 3%        | 3%       |
|             | Barium sulfide               | 0.01%    | 0.0005%   | 0%       |
|             | Barium chloride dihydrate    | 0.5%     | 0.5%      | 0.8%     |
|             | Strontium chloride hexahydrate | 0.004% | 0.04%     | 0.07%    |

Figure 24:
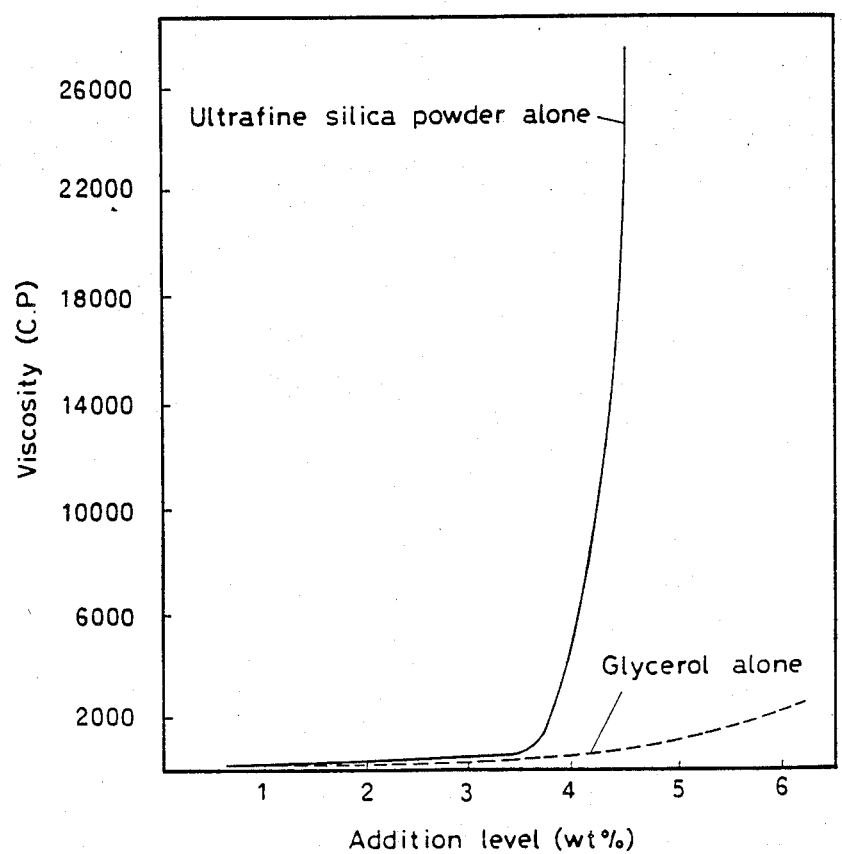
FIG. 24 is a graphical representation of the relationship between the level of addition of an ultrafine silica powder or glycerin and the viscosity of the heat storage composition in the molten state.

The solid line in the figure is for the case in which the ultrafine silica powder alone was added as the thickening agent, and the broken line is for the case in which glycerin was added alone. As is evident from FIG. 24, the ultrafine silica powder has excellent thickening effect. It gave high viscosity values in lower concentrations as compared with glycerin, in particular at addition levels not lower than 3.5 percent. However, the ultrafine silica powder showed a rapid viscosity increase after the addition level exceeds 3.5 percent. This means that a small difference in addition level means a great variation in viscosity. Such situation is unfavorable from the viscosity adjustment viewpoint and makes it difficult to specify a desired viscosity particularly in the manufacture of heat storage compositions.

Example 2

Figure 25:
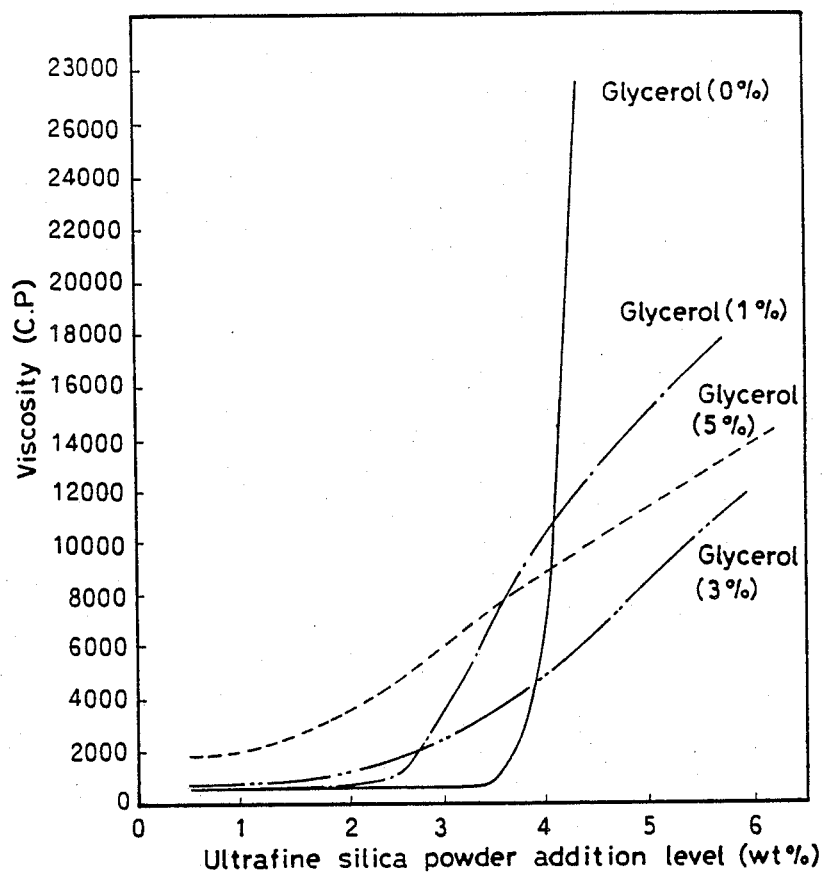
FIG. 25 is a graphical representation of the influence of the level of addition of an ultrafine silica powder and of glycerin on the viscosity of the heat storage composition in the molten state.

FIG. 25 shows the data obtained by adding, to the basic heat storage composition (1) given in Table 7, an ultrafine silica powder alone (solid line), the ultrafine silica powder and 1 percent of glycerin combinedly (dot-and-dash line), the ultrafine silica powder and 3 percent of glycerin combinedly (dot-dot-dash line) and the ultrafine silica powder and 5 percent of glycerin (broken line), respectively. Whereas, as mentioned above, the single use of the ultrafine silica powder at an addition level of about 3.5 percent or above results in a rapid viscosity increase, so that fine viscosity adjustment is practically difficult in said range, FIG. 25 reveals that the use of the ultrafine silica powder in combination with glycerin makes gentle the ultrafine silica powder content-viscosity curve and furthermore gives an adequate viscosity increase curve also in the addition level range below 3.5 percent. Thus, the ultrafine silica powder and glycerin cooperate in a complementary manner across the boundary at the ultrafine silica powder addition level of about 3.5 percent to give a gentle and adequate viscosity increase curve as a whole. While the pattern of the viscosity curve for the combined use of these two thickening agents is affected in a complicated manner by the addition levels for the respective additives including both the thickeners and other factors, it is advisable and preferable for adjusting the viscosity of the heat storage composition to add glycerin in an amount of 1-5 percent and the ultrafine silica powder in an amount of 1.5-6 percent. By suitably adjusting the proportion between both the thickening agents and the total addition level therefor, it is possible to obtain, in heat storage compositions, any desired viscosity within a broad range stably.

Example 3

Figure 26:
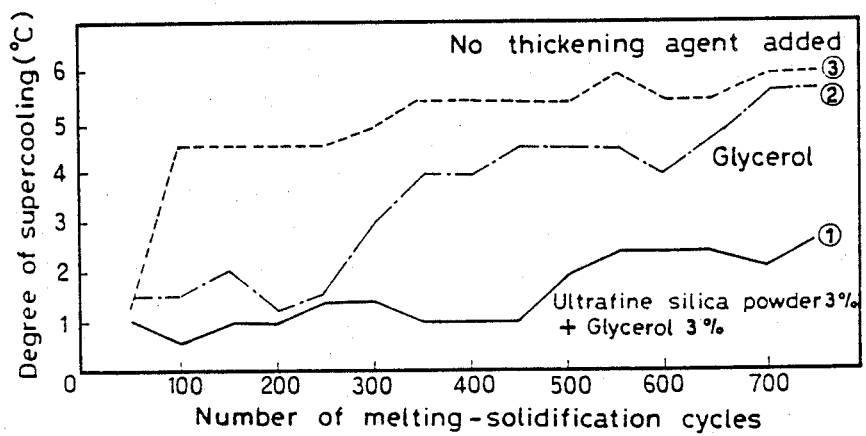
FIG. 26 is a graphical representation of the relationship between the number of melting-solidification cycles and the degree of supercooling for an example of the heat storage composition according to the invention.

FIG. 26 shows the stability of a heat storage composition specified in Table 8 as composed of calcium chloride hexahydrate as the main component, a solidification point modifier (zinc chloride) and nucleating agents (barium chloride dihydrate, barium sulfide and strontium chloride hexahydrate) after addition of (1) an ultrafine silica powder and glycerin as thickening agents each in an amount of 3 percent (solid line), (2) glycerin in an amount of 5 percent (dot-and-dash line) as a thickening agent, or (3) without addition of any thickening agent. The stability data obtained by repeating the melting-solidification cycle are shown in the figure for comparison.

TABLE 8

| Composition | Invention (1) | For comparison (2) | Control (3) |
|---|---|---|---|
| Calcium chloride hexahydrate | Balance | Balance | Balance |
| Zinc chloride | 12% | 12% | 12% |
| Barium chloride dihydrate | 0.8% | 0.8% | 0.8% |
| Barium sulfide | 0.01% | 0.01% | 0.01% |
| Strontium chloride hexahydrate | 0.04% | 0.04% | 0.04% |
| Glycerin | 3% | 5% | — |
| Ultrafine silica powder | 3% | — | — |

As is evident from FIG. 29, the composition after addition of 3 percent each of the ultrafine silica powder and glycerin retained a degree of supercooling as low as about 1.5° C. even after 300 times of repeated use, and the increase in the degree of supercooling as observed after continued repeated use was always slight. Even after 700 or more times of repeated use, the solidification point depression remained not more than 2.5° C. On the contrary, without the thickening agents, the degree of supercooling showed a tendency toward rapid increase from the beginning of repeated use and, after about 100 times of use, said degree reached a level as high as 4.8° C. The composition for comparison (dot-and-dash line) containing 5 percent of glycerin alone retained a degree of supercooling not greater than 2° C. approximately at the 250th cycle. This degree of supercooling, or performance, was comparable to that found in the case of the combined use of the ultrafine silica powder and glycerin [composition (1)]. However, after the 250th cycle, the degree of supercooling increased as a result of gradual phase separation. Thus it can be understood that the single use of glycerin alone as the thickening agent gives only compositions lacking in long-term stability in repeated use thereof.

The following are typical examples of the heat storage composition which contain an ultrafine silica powder and glycerin as thickening agents and characteristics thereof.

| [1] | Calcium chloride hexahydrate | 95% |
|---|---|---|
| | Strontium chloride hexahydrate | 0.05% |
| | Barium chloride dihydrate | 0.1% |
| | Barium sulfide | 0.1% |
| | Ultrafine silica powder | 3.5% |
| | Glycerin | 1% |
| | Solidification point 29.6° C. | |
| | Viscosity 7000 cP | |
| [2] | Calcium chloride hexahydrate | 92% |
| | Strontium chloride hexahydrate | 0.004% |
| | Barium chloride dihydrate | 0.8% |
| | Barium sulfide | 0.03% |
| | Glycerin | 3% |
| | Ultrafine silica powder | 4% |
| | Solidification point 25° C. | |
| | Viscosity 4800 cP | |
| [3] | Calcium chloride hexahydrate | 80% |
| | Sodium bromide | 15% |
| | Strontium chloride hexahydrate | 0.01% |
| | Barium chloride dihydrate | 0.05% |
| | Barium sulfide | 0.01% |
| | Glycerin | 3% |
| | Ultrafine silica powder | 4% |
| | Solidification point 19° C. | |
| | Viscosity 4800 cP | |
| [4] | Calcium chloride hexahydrate | 83.19% |
| | Ammonium bromide | 10% |
| | Barium sulfide | 0.01% |
| | Barium chloride dihydrate | 0.8% |
| | Strontium chloride hexahydrate | 0.04% |
| | Ultrafine silica powder | 3% |
| | Glycerin | 3% |
| | Solidification point 18° C. | |
| | Viscosity 2500 cP | |
| [5] | Calcium chloride hexahydrate | Balance |
| | Ammonium bromide | 10% |
| | Strontium chloride hexahydrate | 0.07% |
| | Barium chloride dihydrate | 0.65% |
| | Ultrafine silica powder | 5% |
| | Glycerin | 3% |
| | Solidification point 18° C. | |
| | Viscosity 8500 cP | |

The present invention has the above-mentioned constitution and the effects of the invention may be summarized as follows:

(1) The phenomenon of supercooling in heat storage compositions whose main component is calcium chloride hexahydrate can be radically reduced or substantially prevented by combinedly using barium sulfide, barium chloride dihydrate and strontium chloride hexahydrate as nucleating agents each in a small amount in said compositions. Therefore, the temperature at which the latent heat is utilized can be controlled exactly and precisely without any substantial decrease in heat storage capacity.

(2) The melt viscosity of such heat storage composition as mentioned above can be adjusted as desired within a relatively broad range by combinedly using an ultrafine silica powder and glycerin as thickening agents each in a small amount. The resulting composition does not deteriorate with respect to its performance characteristics upon repeated use thereof.

(3) The improvement in the structure of heat storage capsules mentioned above which sealedly contain the above heat storage composition further ensures the dispersion of nucleating agents which serve to promote phase transition of the heat storage composition and makes it possible for the dew condensate surface water possibly appearing during heat release to flow down easily, so that the heat storage and release effects can be produced with a maximum efficiency. Each capsule is wholly integral inclusive of recesses as a result of fusion bonding. Furthermore, the grooves for drainage also serve as reinforcing ribs, so that the strength of the capsule itself is also improved significantly.

(4) The temperature control apparatus constructed by building the above heat storage capsules therein, if in short supply of heat due to insufficiency of the quantity of heat released by heat storage capsule groups, can assuredly get supplementary heat supply by means of the heating unit and blower unit and, furthermore, the heat storage and release effects of the heat storage capsule groups can be produced efficiently without causing great heat losses.

We claim:

1. A flat latent heat storage capsule which comprises a rectangular plate-like hollow vessel having a plurality of oblong recesses surrounded by slant faces as formed by bonding together by fusion the face plate bottoms at corresponding sites on both the face places and a plurality of circular holes passing through the hollow vessel in the thickness direction thereof as formed by fusion bonding in the same manner as above to form circular recesses followed by punching at least at the fused bottom of said circular recesses and further having at least one groove-like recess continuously extending in the longitudinal direction in the neighborhood of each of the left and right edge portions of each face plate and a protrusion serving as a spacer in the neighborhood of each of the four corners, the four protrusions on each face plate being located at sites corresponding to the protrusions on the other face plate, said hollow vessel containing a heat storage composition.

2. A flat latent heat storage capsule which comprises a rectangular plate-like hollow vessel having a plurality of oblong recesses surrounded by slant faces as formed by bonding together by fusion the face plate bottoms at corresponding sites on both the face plates and a plurality of circular holes passing through the hollow vessel in the thickness direction thereof as formed by fusion bonding in the same manner as above to form circular recesses followed by punching at least at the fused bottom of said circular recesses and further having at least one groove-like recess continuously extending in the longitudinal direction in the neighborhood of each of the left and right edge portions of each face plate and a protrusion serving as a spacer in the neighborhood of each of the four corners, the four protrusions on each face plate being located at sites corresponding to the protrusion on the other face plate, said hollow vessel containing a heat storage composition, which comprises calcium chloride hexahydrate as the main component, which contains, as nucleating agents for preventing supercooling, 0–5 percent by weight, based on the weight of the total composition, of barium sulfide; 0.001–5 percent by weight, based on the weight of the total composition of barium chloride dihydrate; and 0.001–0.1 percent by weight of strontium chloride hexahydrate, based on the weight of the total composition.

3. The flat latent heat storage capsule of claim 1 or 2, wherein the inlet of the hollow vessel for the heat storage composition is sealed, after charging with said composition, with a stopper by fit-fusion bonding, said stopper comprising a rod having a length almost equal to the vessel wall thickness at said inlet as measured in the direction of the depth of said inlet.

4. The flat latent heat storage capsule of claim 1 or 2, wherein the inlet of the hollow vessel for the heat storage composition is sealed, after charging with said composition, with a stopper by fit-fusion bonding, said stopper comprising a disk segment and a rod segment formed solidly with said disk segment and having a length almost equal to the vessel wall thickness at said inlet as measured in the direction of the depth of said inlet.

5. The flat latent heat storage capsule of claim 1 or 2, wherein the inlet of the hollow vessel for the heat storage composition is sealed, after charging with said composition, with a stopper by fit-fusion bonding, said stopper comprising a disk segment and a rod segment formed solidly with said disk segment and having a length almost equal to the vessel wall thickness at said inlet as measured in the direction of the depth of said inlet, with a ring-shaped protrusion provided on that side of said disk segment which carries said rod segment.

6. A temperature control apparatus for use in hothouses or the like which comprises a heat storage unit equipped with plural units of the flat latent heat storage capsule of any of claims 1–5, said heat storage unit being built in said temperature control apparatus, said temperature control apparatus further comprising a blower unit for introducing the air within a hothouse into said apparatus, passing the same through said heat storage unit and sending the same out of said apparatus, said apparatus being characterized in that a heating unit for heating the air introduced into said apparatus by said blower unit is built in said apparatus downstream (with respect to the air current caused by said blower unit) from said heat storage unit.

* * * * *